United States Patent [19]

Kloss

[11] 4,365,183

[45] Dec. 21, 1982

[54] PROJECTION TELEVISON TUBE AND PROCESS FOR FORMING SAME

[76] Inventor: Henry E. Kloss, 174 Brattle St., Cambridge, Mass. 02138

[21] Appl. No.: 234,913

[22] Filed: Feb. 17, 1981

Related U.S. Application Data

[63] Continuation of Ser. No. 875,222, Feb. 6, 1978.

[51] Int. Cl.³ .................... H01J 31/00; H01J 29/24
[52] U.S. Cl. .................... 313/478; 313/474;
358/250
[58] Field of Search ............................ 313/478

[56] References Cited

U.S. PATENT DOCUMENTS

| | | | |
|---|---|---|---|
| 2,305,855 | 12/1942 | Epstein et al. | 313/474 X |
| 2,435,296 | 2/1948 | Szegho | 313/478 |
| 2,440,735 | 5/1948 | Cawein | 313/381 |
| 2,440,736 | 5/1948 | Cawein | 313/478 |
| 2,453,003 | 11/1948 | Edwards | 313/478 |
| 2,459,637 | 1/1949 | Frihard et al. | 313/478 |
| 2,466,329 | 4/1949 | Samson et al. | 313/474 |
| 2,467,462 | 4/1949 | Brown | 313/421 |
| 2,473,320 | 6/1949 | Wynn et al. | 313/474 |
| 2,491,072 | 12/1949 | Baker et al. | 350/200 X |
| 2,520,190 | 8/1950 | Amdursky | 313/482 |
| 2,562,163 | 7/1951 | Hiensch et al. | 313/482 |
| 2,637,829 | 5/1953 | Trad | 313/476 |
| 2,960,615 | 11/1960 | Harries | 313/474 |
| 3,524,197 | 8/1970 | Soule | 313/423 |
| 3,969,648 | 7/1976 | Hergenrother et al. | 313/482 |
| 4,024,579 | 5/1977 | Hergenrother et al. | 358/247 |
| 4,034,398 | 7/1977 | Sheldrake et al. | 313/474 |
| 4,054,913 | 10/1977 | Lerner | 220/2.1 A |
| 4,121,131 | 10/1978 | Esdonk et al. | 313/402 |

FOREIGN PATENT DOCUMENTS

| | | | |
|---|---|---|---|
| Ad.61243 | 6/1955 | France | 220/2.1 A |
| 53-103653 | of 0000 | Japan . | |
| 50-151027 | 12/1975 | Japan . | |
| 52-37720 | 1/1976 | Japan . | |
| 52-21523 | 3/1976 | Japan . | |
| 51-144174 | 12/1976 | Japan . | |
| 52-8584 | 2/1977 | Japan . | |
| 53-28330 | 4/1978 | Japan . | |

Primary Examiner—Robert Segal
Attorney, Agent, or Firm—Bacon & Thomas

[57] ABSTRACT

An envelope for a projection television tube includes a spherically curved electronic beam target surface spaced away from the neck of the tube, a larger reflective surface spherically curved concentrically with the target surface on an end plate located close to the tube neck, a target support that preferably constitutes a face plate for the envelope, and a hollow cylindrical spacer member for closing the side of the tube envelope and for holding the target support accurately spaced from the reflective surface. The ends of the cylindrical member and the abutting surfaces of the end plate and target support are all configured to provide joint interfaces between the elements that lie in spherical planes that are concentric with the target and reflective surfaces, so that slight lateral motion of the parts during assembly and handling will not affect tube projection optics, while the spacing between the target and reflective surfaces is precisely maintained in concentric relationship.

8 Claims, 20 Drawing Figures

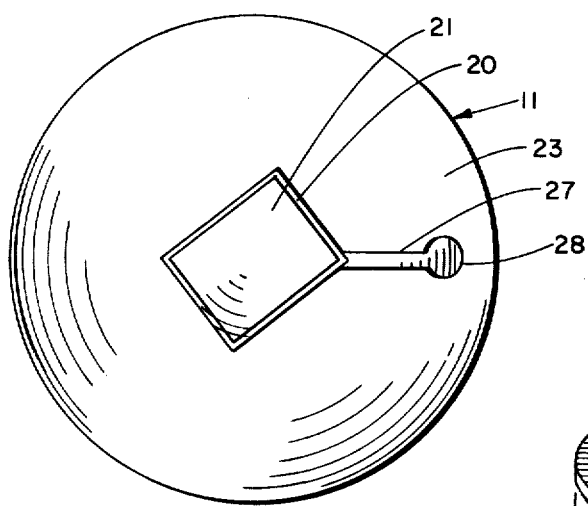
Fig. 2
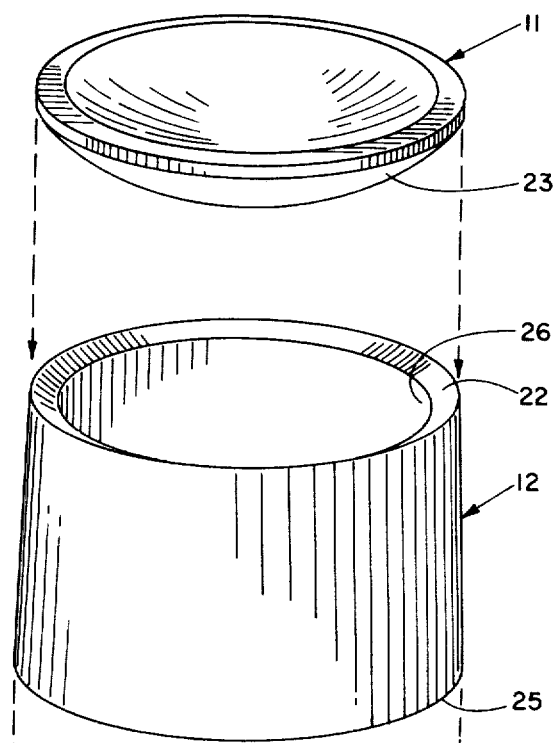
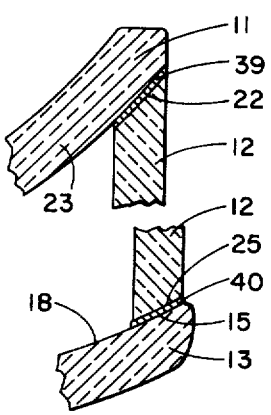
Fig. 4
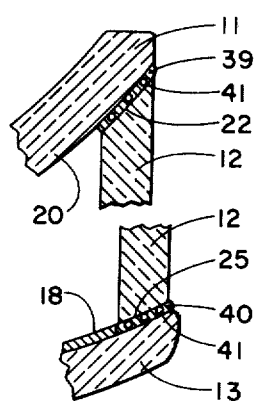
Fig. 5
Fig. 3

PROJECTION TELEVISON TUBE AND PROCESS FOR FORMING SAME

This application is a continuation, of application Ser. No. 875,222, filed Feb. 6, 1978.

BACKGROUND OF THE INVENTION

This invention relates to projection television and more particularly to an improved envelope for a projection television tube, to a projection television tube incorporating the envelope and to a process for forming the envelope.

Projection television is a well established technique. However, because of the high cost involved in manufacturing the projection television tubes used, projection television has generally been limited to expensive, complicated, large screen units which are both difficult to install and expensive to maintain in satisfactory alignment. Thus the complexity and cost of the presently available projection television tubes have critically curtailed the development and acceptance of projection television systems for home entertainment, a use which could represent a very high-volume market.

Projection television systems for color projection commonly include three tubes each having a different color (conveniently referred to as red, green and blue) projecting pictures which are superimposed in registry on a common view screen. Typically, the most efficient of such tubes incorporate the optics of a Schmidt-type projection system and comprise a target illuminated in a single color by a suitable specific phosphor as an electron beam raster, a spherical reflector directing the light around the periphery of the target and a correction lens for any spherical aberration.

Within these tubes, certain dimensions are critical, a fact which has heretofore given rise to the high cost of constructing the projection tube envelopes to achieve a high level of reliability and reproducibility of optical characteristics. In particular, it is essential to locate and maintain the spacing between the mirror surface and the target surface at a predetermined value within about ±0.001 to 0.002 inch (about 0.025 to 0.050 mm). Projection tubes of the prior art have therefore been constructed to incorporate expensive and complicated means both to position the target during envelope and tube manufacture and to adjust its location both during manufacture and installation. A relatively early approach to achieving a partial solution to this problem was to incorporate the mirror within the tube envelope by forming it on that internal envelope surface opposing the target surface. This, however, still necessitated maintaining the critical dimensions of more than one envelope component as well as the precise relative positioning of the components. (See for example U.S. Pat. Nos. 2,467,462 and 2,637,829.) As this art has progressed in its development, more and more complex mechanisms have been incorporated into the tubing envelope and associated with it to achieve and maintain the required mirror/target alignment and critical distance.

Thus, it is obvious that it would be highly desirable to provide an envelope for a projection television tube which is relatively simple in construction but which is capable of achieving during construction and maintaining during use the required precise spatial distance and optical alignment between mirror and target surfaces.

BRIEF DESCRIPTION OF THE INVENTION

The present invention, in its broadest aspects, provides an envelope for a projection television tube that enables low-cost assembly of a projection tube utilizing Schmidt optics, namely a spherically curved electronic beam target surface and a larger reflective surface that enlarges and enables projection of the image that is displayed on the target surface.

The projection tube envelope includes a neck portion of the tube and a end plate adjacent the neck portion upon which a spherically curved reflective surface is provided. Spaced apart from the reflective surface along the tube projection axis is a phosphor electron beam target surface that is spherically curved and is smaller than the reflective surface. Both the target and the reflective surfaces are concentric about a center that is located in front of the tube envelope along the projection axis of the tube.

The target surface is attached to a target support member and the target support member is held in axially spaced relationship in front of the reflective surface by a hollow cylindrical member that forms the outer side wall of the envelope.

The present invention, in its preferred mode, contemplates forming the joint connections between the hollow cylindrical member, the end place and the face plate so that the abutting joint interfaces between the elements lie within spherical planes that are concentric with the target and the reflective surfaces. The provision of the joint surfaces that lie in spherical planes that are concentric with the target and reflective surfaces enables precise spacing of the target surface from the reflective surface while permitting slight relative displacement in a lateral sense of the elements during assembly without disturbing the projection optics of the tube.

More specifically, an envelope for a projection television tube is provided that includes an end plate having an internal reflective surface lying in a spherically curved plane having a center of curvature located forwardly of the end plate on the projection axis of the tube and a target surface spaced in front of the end plate along the projection axis of the tube, the target lying in a spherical plane that is concentric with the reflective surface.

The target is secured to a target support having a peripheral edge sealing area lying in a spherically curved plane that is concentric with the target and reflective surfaces. Extending between the end plate and the target support is provided a hollow cylindrical member of predetermined length that defines the side of the tube envelope and maintains the target surface accurately spaced from the reflective surface. The cylindrical member and the target support are joined along a joint interface surface area lying in a spherical plane that is concentric with the target and reflective surfaces.

The cylindrical member and the end plate are also joined along a joint interface area that lies in a spherical plane that is concentric with said target and reflective surfaces.

The end plate, target support and cylindrical member are bonded together along their mutual joint interface surface areas in sealed relationship to complete the tube envelope.

The invention also contemplates a process for making an envelope for a projection television tube that includes a tube end plate adjacent the tube neck, a spherically curved electron beam target spaced from the end plate within the envelope, a reflective surface larger than the target and located adjacent the end plate in concentric relationship with and facing the target surface, a target support member for supporting the target surface in the envelope and a hollow cylindrical member extending along the tube axis between the end plate and the target support for maintaining the spacing between the target surface and the reflective surface, the process comprising the steps of: (a) providing joint surface areas on the opposite ends of the cylindrical member and the adjacent target support member and end plate that lie in spherically curved planes that are concentric with said target and reflective surfaces; (b) placing the cylindrical member on the end plate and placing the target support with the target surface attached thereto on the cylindrical member so that the joint surface areas are contiguous; and (c) bonding the end plate, cylindrical member and target support member together by using high temperature fusible frit between the joint surfaces, heating the assembly to fuse the frit and finally cooling the assembly.

Various embodiments of the invention are also contemplated, as will become evident from a review of the detailed description to follow.

DESCRIPTION OF THE DRAWINGS

For a fuller understanding of the nature and objects of the invention, reference should be had to the following detailed description taken in connection with the accompanying drawings in which

FIG. 2 is plan view of the internal surface of the face plate of the tube envelope of FIG. 1;

FIG. 3 is an expanded, perspective view illustrating the assembly of the projection television tube envelope of FIG. 1;

FIGS. 4–9 illustrate in cross sectional detail different techniques for sealing the face plate and cylindrical sections of the projection television tube envelope;

FIGS. 1 and 2 illustrate a preferred embodiment of the projection television tube envelope of this invention; and FIG. 3 is an expanded view of the three components forming the envelope. A complete projection television tube incorporating the envelope of FIGS. 1–3 is shown in FIG. 18 and described below.

DETAILED DESCRIPTION

Figure 1:
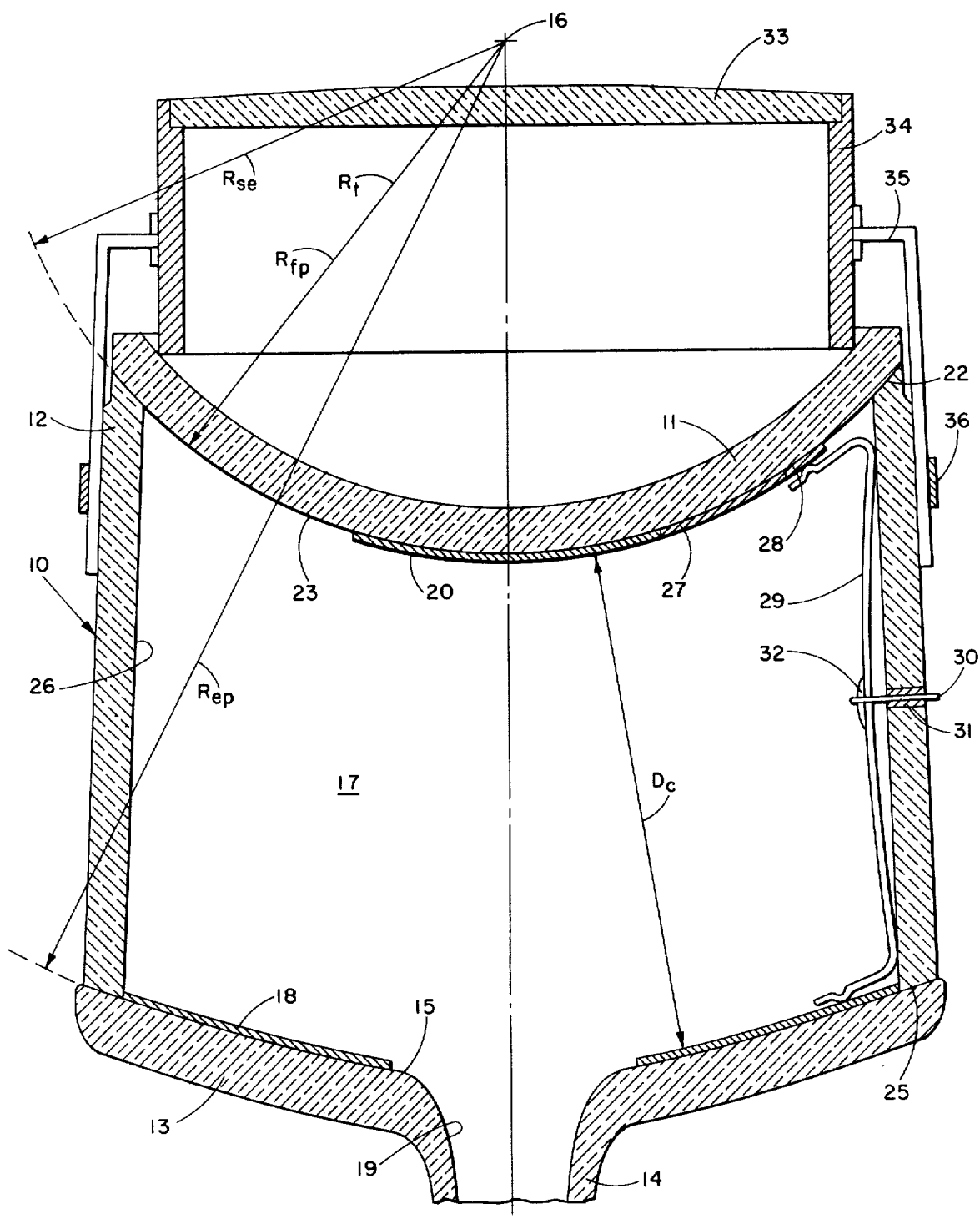
FIG. 1 is a longitudinal cross section through the envelope portion of one embodiment of a projection television tube constructed in accordance with this invention.

The projection television tube envelope of this invention, generally designated by the reference numeral 10, is shown in FIG. 1 to be formed of three principal components which comprise an optically transparent face plate 11, a cylinder-like wall member 12 which may be slightly flared, and an end plate 13 to which is joined a central neck section 14. In keeping with known practice, the annular internal surface 15 (FIG. 3) of end plate 13 facing the internal wall of face plate 11 is configured with the sphericity of a sphere having a center 16 and a radius $R_{ep}$. That annular portion of surface 15 within envelope volume 17 is coated, e.g., aluminized, to provide a mirror 18. Thus, mirror 18 can be said to be a spherical segment or, more conveniently, to be of spherical configuration, a term used hereinafter to denote a portion of a spherical surface. It will, of course, be appreciated that mirror 18 is not as thick as shown in FIG. 1. However, mirror and target surfaces are exaggerated in the drawings for ease of identification.

The internal surface 19 of neck 14 is coated with a suitable electrically conductive coating, such as a colloidal graphite coating sold under the tradename of Dag. This coating extends up to and in contact with the edge of mirror 18.

In the Schmidt system a beam of electrons is directed against a phosphor target 20 within a specified target surface area referred to as the raster 21 (FIG. 2). The target surface, generally rectangular in shape, must be of a spherical configuration, i.e., configured with the sphericity of a sphere of radius $R_t$ which has a center essentially coincident with center 16 of the sphere defining the configuration of the surface of mirror 18. In this manner the radial distance $D_c$ between mirror 18 and target 20 remains essentially constant. The attaining and maintaining of this distance $D_c$ is critical to the manufacturing of projection television tube envelopes and the tubes incorporating them.

In accordance with the practice of this invention the positioning of target 20 to achieve the desired relationship with mirror 18 is accomplished by providing the cylinder-like member, (hereinafter, for convenience, referred to as the cylindrical member) with an annular face plate sealing end 22 configured so that it defines a joint surface that lies within a spherical plane that is concentric with the mirror 18 and the target 20. Thus, in the embodiment of FIG. 1, sealing end 22 is configured to lie in the plane of a theoretical sphere of radius $R_{se}$ with a center essentially coinciding with center 16 of the sphere of radius $R_{ep}$ defining the surface of mirror 18 and target 20. The configuration of the end 22 may be continuously smoothly curved as shown in FIG. 1 or configured to present a diffirent shape as will be seen below in conjunction with the description of FIGS. 6 and 8.

By affixing target 20 to a target support member which engages the sealing end 22 of cylinder-like member 12, the target support member and the target affixed thereto may experience small lateral motion along the sealing line without causing any effective shifting of the target surface relative to the mirror. Thus, a lateral motion of the target support member of up to as much as from about 0.050 to about 0.070 inch (about 1.25 to about 1.75 mm) from true sealing surface alignment during assembly and sealing will not adversely affect the optical characteristics of the projection tube incorporating the envelope so constructed, since the critical distance $D_c$ will be maintained and the target 20 will not be effectively shifted out of line with the optical axis of the projection tube.

Thus the role of the cylindrical member, in addition to that of forming a portion of the envelope wall, is that of accurately positioning the target surface relative to the mirror surface to attain the desired, predetermined spacing $D_c$. This means that the height of the cylindrical member is the one critical dimension in the tube envelope construction. Because the cylindrical member can take various cross sectional configurations, a cylindrical member of predetermined height may be defined as that cylinder-like member which, when interposed between the end plate mirror and the spherical surface of the target holding means results in the essential coincidence of the centers of curvatures of the mirror and target. The cylindrical member thereby becomes the envelope component serving as the sole means for positioning the target relative to the mirror.

As will be apparent from the following detailed description, the target support member may take any of a number of forms, so long as it has a sealing edge configured to engage the sealing end of the cylindrical member and likewise lies in a spherical plane that is concentric with the mirror 18 and target 20. In the tube envelope embodiment of FIGS. 1-3, face plate 11 serves in the dual role of target support member and face plate, the target being deposited directly on the internal surface 23 of face plate 11. Typically, target 20 will be formed by vacuum depositing an aluminum film on surface 23 and then depositing the desired phosphor over the aluminum. As will be seen in FIG. 2, the actual target area 20 is made somewhat larger in both dimensions than the raster 21-to be printed on it. For example, it will generally be desirable to form the target about 0.060 to about 0.065 inch (about 1.5 to about 1.75 mm) larger than raster 21 on each of the four sides to compensate for any of the allowable lateral movement of the target support member in assembling and sealing the envelope.

Although target 20 is illustrated for convenience in the drawing to have a considerable thickness, it should be understood that for all practical purposes it may be considered to have a surface coincident with internal surface 23 of face plate 11, or of any other substrate on which it is deposited. This, in turn, means that the internal surface 23 of face plate 11 and the surface of target 20, in order to meet the requirements for target alignment, are also configured to be concentric with the mirror. Hence, the spherical surfaces defining face plate 11 and target 20 can be seen to have radii $R_{fp}$ and $R_t$ which are essentially equal to $R_{se}$. Thus, in the preferred envelope embodiment shown in FIGS. 1-3 the spherically configured face plate is affixed to sealing end 22 in any suitable manner such as illustrated in FIGS. 4-6 and 8 to achieve the desired radial-distance $D_c$ between mirror and target.

The envelope embodiment of FIGS. 1-3 is constructed of three separate components as shown in the expanded view of FIG. 3. In such a case, face plate 11, cylindrical member 12 and end plate 13 with neck 14 are molded of an appropriate glass and machined to define the desired configuration of the mirror and sealing surfaces. In those envelope embodiments in which the cylindrical member 12 is to be affixed to the end plate, it is also necessary to shape the end plate sealing end 25 of cylindrical member 12 to essentially conform or to present a surface which essentially conforms in sphericity to that of mirror 18, i.e., to the internal surface 15 of the end plate. Thus it may be seen that the end plate sealing end of cylindrical member 12 presents a surface which is configured with the sphericity of a sphere of radius $R_{ep}$.

Although it is generally preferable to form cylindrical member 12 with a slight flare, it is also, of course, within the scope of this invention to form it with any other suitable configuration. It will, however, be appreciated that the critical dimension, $D_c$, is determined by the distance maintained between the target support member and mirror and that this distance is determined solely by the height dimension of cylindrical member, taking into account, if necessary, the thickness of any frit layer or layers interposed between the components.

Before discussing the various techniques which may be used to seal together the components of the envelope, it will be convenient to complete the description of the remaining elements of the envelope. In accordance with known techniques in constructing the envelope, the internal surface 26 of cylindrical member 12 is coated with an electrically conductive coating, e.g., a suitable colloidal graphite coating, and an electrical connection is provided between mirror 18 and target 20. This electrical connection comprises a film strip 27 of an electrically conducting material, e.g., aluminum, coated on face plate surface 23 contacting target 20 (FIG. 2) and terminating in an enlarged contact area 28, e.g., one coated with colloidal graphite; and an electrically conductive wire 29, e.g., of stainless steel, shaped to force its dimpled ends into contact with area 28 and mirror surface 18. An external anode terminal 30 is inserted through and sealed to the wall of cylindrical member 12, by frit 31, to contact wire 29 through spring clip 32 thus providing one of the necessary electrical contacts for the projection television tube incorporating the envelope. Alternatively, this annode terminal may be inserted through and sealed in the end plate.

A correcting lens 33 is held in spaced relationship to face plate 11 by a lens supporting ring 34 which when seated on face plate 11 results in automatically aligning lens 33 with respect to the other optical components of the tube. Supporting ring 34 is affixed to the envelope through a plurality of spaced angled arms 35 held to cylindrical member 12 by an adjustable band 36. Lens 33 not only serves to correct the spherical aberrations inherent in the optics of the system, but also, with support ring 34, protects face plate 11. The actual design and positioning of lens 34 is within the capabilities of an artisan of ordinary skill in the optical arts; and it will be apparent that the proper selection of correction lens with slightly different effective powers can be used to correct for any small dimensional inaccuracies of the envelope.

FIGS. 4-9 illustrate in cross sectional detail several ways in which face plate 11, cylindrical member 12 and end plate 13 of the envelope embodiment of FIGS. 1-3 may be sealed together. In the sealing modification of FIGS. 4 and 5, the face plate sealing end 22 of cylindrical member 12 is ground to have the required sphericity and the end plate sealing end 25 is ground to the same sphericity as mirror 18. Sealing is accomplished through the use of two layers of frit 39 and 40 (typically a commercially available lead oxide frit) between the face plate and cylindrical-member and between the cylindrical member and end plate, respectively. It will be appreciated that in this sealing embodiment it is necessary to accurately control the thickness of frit layers 39 and 40 and to subtract the combined thicknesses of these frit layers in calculating the height dimension of cylindrical member 12 which controls the distance, $D_c$, between the target and mirror.

The actual thickness of frit layers 39 and 40 may be controlled by the use of shim means shown in the modification of FIG. 5 to be accurately graded beads 41 formed of a glass having a melting point sufficiently higher than the activation temperature of the frit material so that they will retain their original shape during sealing. It is also, of course, desirable that the glass from which the beads 41 are formed has a coefficient of thermal expansion essentially the same as that from which the components of the envelope are made. other suitable shim means such as short glass rods or tetrahedrons of appropriate dimensions may be used. In general, it will be preferable to use frit thicknesses ranging between about 0.005 and about 0.015 inch (about 0.1 and about 0.4 mm). Thus, 0.010 inch (0.25 mm) diameter glass beads may be cited as exemplary shim means.

Figure 6:
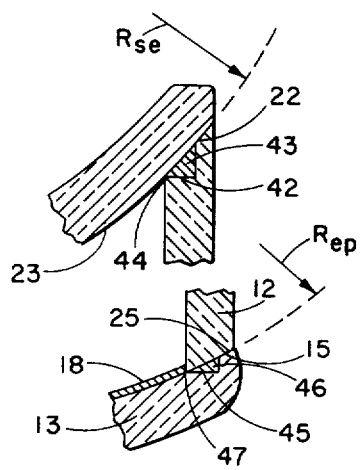
Figure 7:
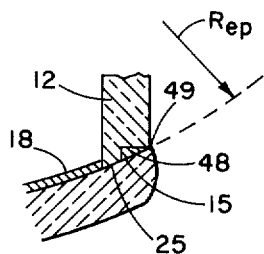

FIGS. 6–9 illustrate several sealing modifications which do not require the making of allownaces for frit thickness in determining and achieving the desired accurate height dimension of the cylindrical member. In the modification of FIG. 6, surface 22 of cylindrical member 12 is ground to have the desired sphericity and then a frit groove 42 is cut out to contain frit 43, taking care to maintain the integrity of internal line contact 44 so that it and the remaining portion of surface 22 present a sealing surface with the desired sphericity. In similar manner, surface 15 of end plate 13 has a frit groove 45, containing frit 46, cut in it to provide a contact line 47 which, with the remaining portion of surface 15, provides the required sealing surface. Alternatively, as shown in FIG. 7, a frit groove 48 may be cut in sealing end 25 of the cylindrical-member, retaining a portion of spherically configured end surface 25 and creating a contact line 49 on the spherical surface with radius $R_{ep}$.

Figure 8:
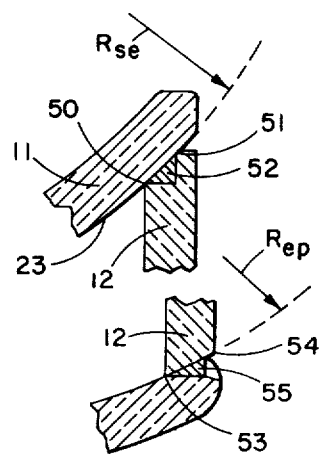
Figure 9:
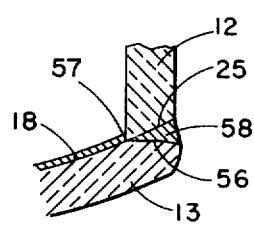

FIG. 8 illustrates a sealing modification in which two parallel circular contact lines 50 and 51 in face plate sealing end 22 of cylindrical member 12 are provided for seating face plate 11 serving as the target support member. Between these contact lines a frit space 52 is provided. It will, of course, be appreciated that both contact lines 50 and 51 must lie on the required spherical surface of the sphere with radius $R_{se}$, corresponding to surface 22 of the face plate sealing end of cylindrical member 12. Thus, these two parallel contact lines 50 and 51 meet the requirement of presenting a surface which conforms in sphericity to the prescribed sphere of radius $R_{se}$ and center 16. Parallel contact lines 53 and 54, defining frit space 55 between them, may also be cut in the peripheral surface of end plate 13 to seal cylindrical member 12 thereto. Finally, as shown in FIG. 9, the peripheral surface of end plate 13 may be formed to have an essentially flat surface 56 so that the end plate sealing end 25 of cylindrical member 12 form a contact line 57 with the end plate and leaves a frit space 58 for sealing.

It will be apparent that a number of combinations of sealing surfaces may be used in constructing the projection television tube envelope and tube of this invention so long as the face plate sealing end surface of the cylindrical member is configured as previously defined.

For convenience, the contact area between the sealing edge of the target support member and the sealing end 22 of the cylindrical member 12 will be referred to as a joint interface surface area; likewise, the contact area between the sealing end 25 of cylindrical member 12 and the sealing edge of the end plate 13. Also, the contact area between the surfaces 72 of feet 71 in FIGS. 12 and 13 may conveniently be referred to herein as a joint interface surface area.

Figure 10:
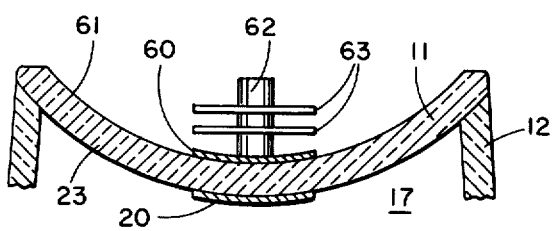
FIGS. 10 and 11 illustrate the incorporation of heat transfer means arranged to cool the target surface.

The face plate configuration of the projection tube of this invention permits the incorporation of external cooling means for the target, thus offering the possibility of attaining a higher light level and a longer tube life. As shown in FIG. 10, a contoured plate 60 formed of a material having relatively high heat conductivity, e.g., copper, is bonded to make thermal contact with the external surface 61 of face plate 11 and positioned to correspond with the position of target 20. Extending upward from plate 60 and in heat transfer contact therewith is a post 62 having one or more heat dissipating fins 63 affixed thereto.

Figure 11:
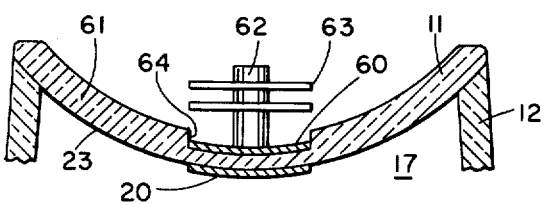

FIG. 11 illustrates a modification of the external cooling means of FIG. 10 in that the plate 60 is set in a well 64 cut in face plate surface 61. Inasmuch as the thickness of the face plate wall through which target heat is transferred by conduction to plate 60 is less than in the arrangement of FIG. 10, the cooling of target 20 is somewhat more efficient in the arrangement of FIG. 11.

Figure 12:
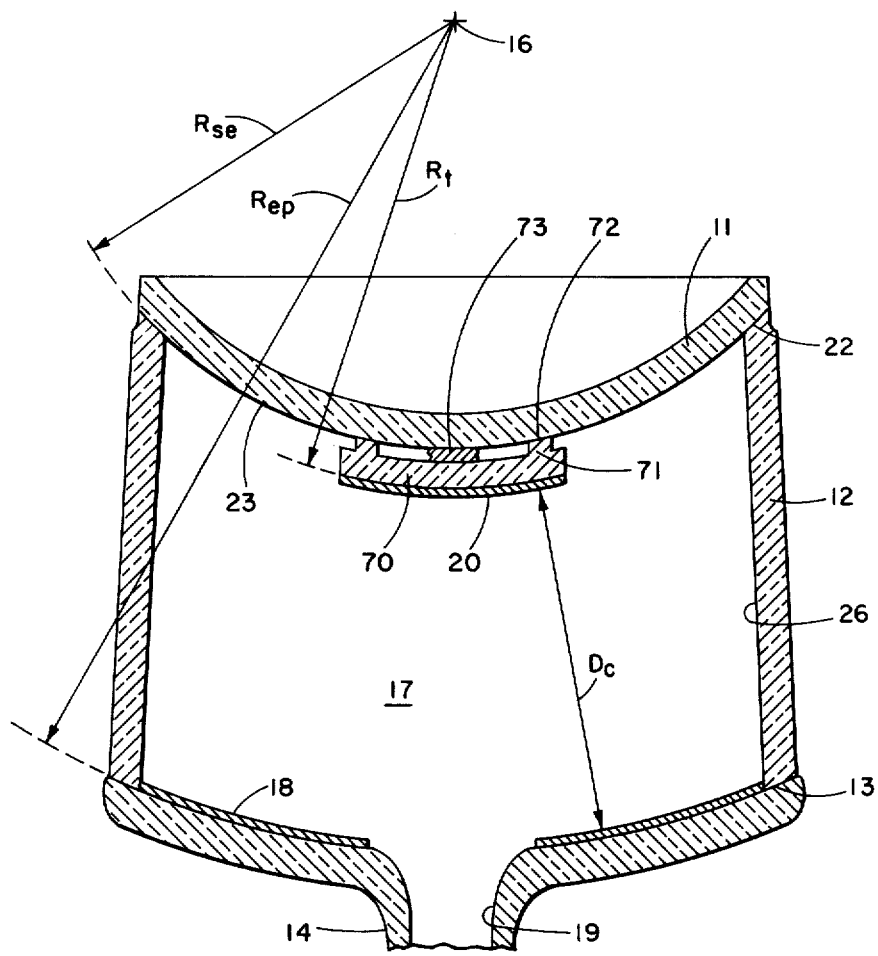
FIGS. 12–14 are longitudinal cross sections through two additional embodiments of the projection television tube envelope constructed in accordance with this invention in which the target support member comprises a target substrate affixed to the face plate.
Figure 13:
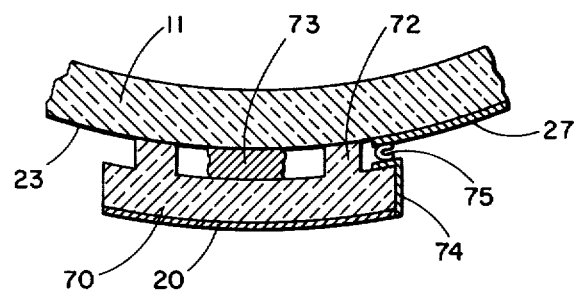
Figure 14:
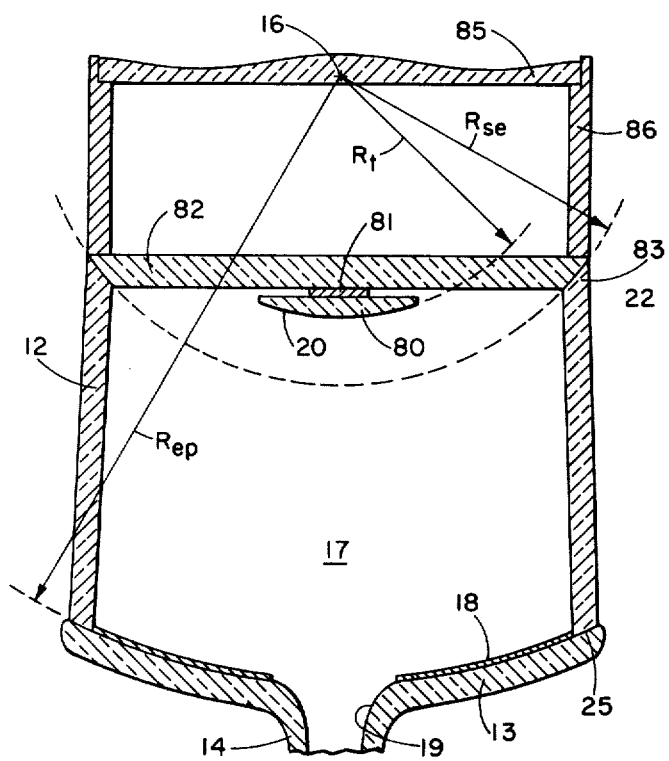

The projection television tube envelope embodiments shown in FIGS. 12–14 use the face plate as a part of the target support means while providing flexibility in the tube optics.

In the envelope embodiment of FIGS. 12 and 13, in which the same reference numbers are used to identify like elements of FIG. 1, the face plate 11, cylindrical member 12 and end plate 13 are configured as described in connection with FIGS. 1 and 3 and sealed by any suitable technique such as one of those described in conjunction with FIGS. 4–9. However, the target 20, deposited as previously described, is on the surface of a substrate 70 preferably formed of the same glass as the envelope or of a glass having essentially the same coefficient of thermal-expansion as the envelope glass. Target substrate 70 preferably has two or more feet 71, the surfaces 72 of which are ground to be concentric with target 20 and mirror 18 to accurately locate target 20 on face plate 11 when affixed thereto with frit 73 which is applied in a quantity to-fill a portion of the space between substrate 70 and surface 23. Thus, the target support means in this embodiment is comprised of face plate 11 and target substrate 70 affixed thereto with the face plate joined to the cylindrical member along a joint interface surface that is concentric with the target 20 and mirror 18.

In the embodiment of FIG. 12, the target substrate provides a target 20 having a surface configured with the sphericity of a sphere of radius $R_t$ and a center which essentially coincides with center 16 of the mirror-defining spherical surface. Thus, although $R_t$ is somewhat greater than $R_{se}$, the conditions set forth for the support of the target relative to the mirror are met since small lateral excursions of face plate 11 with target substrate 70 affixed thereto will have virtually no effect on the radial distance, $D_c$, between target and mirror, and target 20 and mirror 18 will remain in concentric relationship.

In order to provide the electrical connection between target 20 and mirror 18, a narrow film of aluminum 74, or other electrically conductive material, (FIG. 13) may be deposited beginning at the target edge and running along the side and substrate surface opposite the target surface to make contact through a conductive clip 75 with the conductive film 27 deposited on surface 23 of face plate 11 and terminating in a contact area 28 as shown in FIG. 2. The remaining connection through a wire 29 is identical to that shown in FIG. 1. It is, of course, within the scope of this invention to provide any other suitable electrical connection between the target, annode terminal and mirror.

The optics of the embodiment of FIG. 12 are such that a correction lens need not be used since face plate 11 may serve that purpose. This is made possible because there is some freedom in this arrangement to locate the face plate with respect to the mirror; and, if required, the surfaces of the face plate may be configured with reference to the mirror surface to enhance its optical corrective characteristics. It is also, of course, possible and within the scope of this invention to add to the embodiment of FIG. 12 an appropriately configured corrective lens in the manner shown in FIG. 1 to provide a television projection tube of the highest performance capabilities.

The projection television tube envelope of FIG. 14 employs a target substrate 80 affixed by frit 81 to a flat face plate 82 as the target support means engaging the cylindrical member sealing end surface 22. In this embodiment the peripheral engaging surface 83 of face plate 82 is ground to have the sphericity of a sphere of radius $R_{se}$ and the target substrate 80 to have the sphericity of a sphere of radius $R_t$, both having centers of curvature essentially coincident with that of the sphere of radius $R_{ep}$ defining the mirror surface. It will be apparent that this embodiment also meets the requirements for the envelope components.

The use of an essentially flat face plate necessitates, for good performance, the incorporation of a correction lens 85 supported on a lens support 86 which is sealed to the outer rim of face plate 82. The configuration of lens 85 is known in the art and it is positioned so that its optical center essentially coincides with spherical center 16; and in the assembly of the envelope components, lens 85 is located by wellknown optically observed self-imaging techniques.

Figure 16:
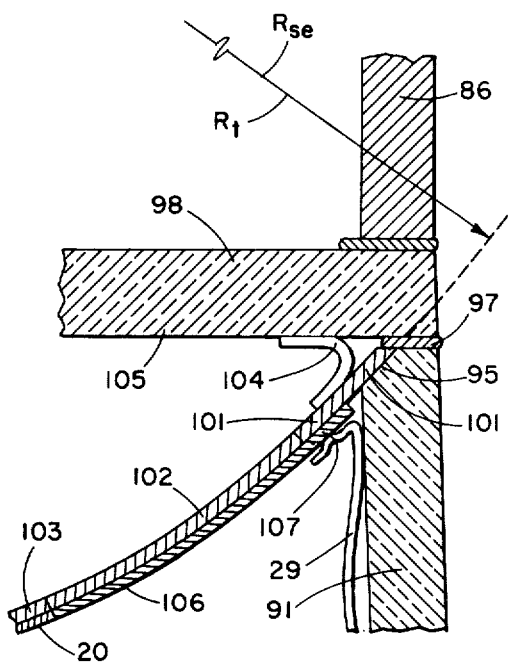
FIGS. 15 and 16 are longitudinal cross sections through another embodiment of a projection television tube envelope constructed in accordance with this invention incorporating a separate target support means.
Figure 15:
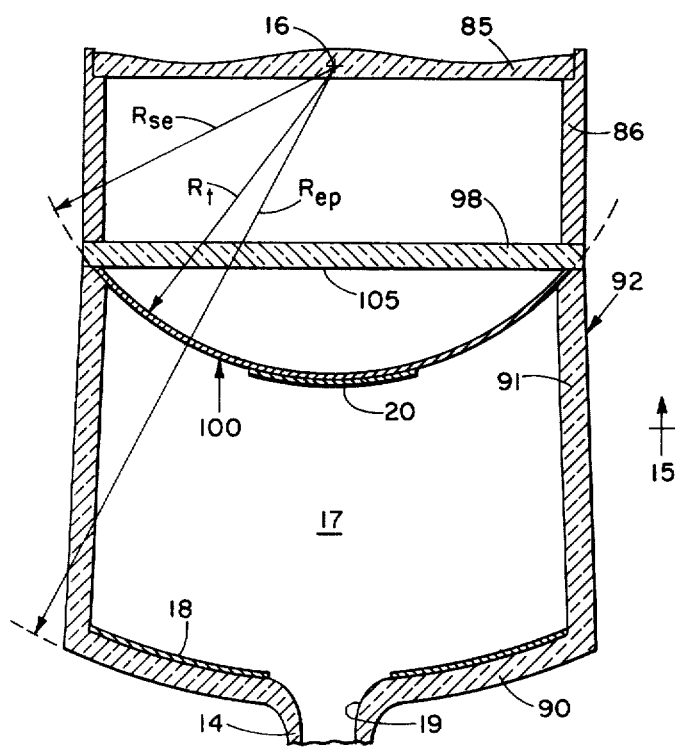
Figure 17:
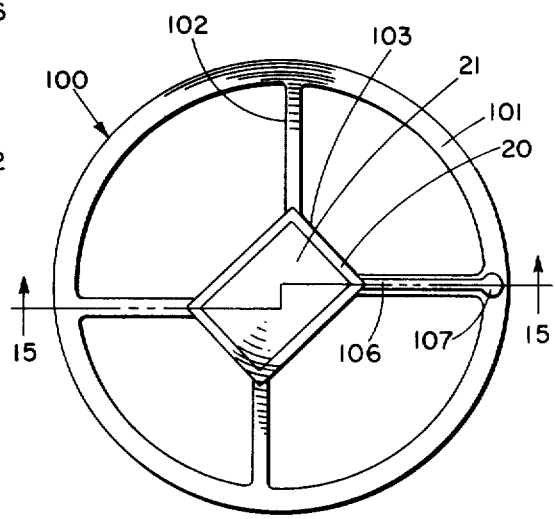
FIG. 17 is a plan view of the target support means used in the envelope embodiment of FIGS. 15 and 16.

In the tube envelope embodiment shown in FIGS. 15-17 the end plate 90 and cylindrical member 91 are formed as an integral piece 92 prior to the sealing of the face plate to the cylindrical member. Thus, cylindrical member 91 may be flame sealed to end plate 90 or these two components may be initially molded as an integral piece. This arrangement is, of course, applicable to any of the tube envelope embodiments of this invention. Alternatively, the envelope of FIG. 15 may be constructed of a separate end plate and cylindrical member as previously described. The embodiment of FIGS. 15-17 also incorporates a target holding means which is separate and distinct from the face plate. In this arrangement the inner surface 95 of the face plate sealing end of cylindrical member 91 is ground to have the required sphericity, i.e., that of a sphere of radius $R_{se}$; and the outer surface 96 is ground flat to support and have sealed thereto, through frit 97, a flat, circular face plate 98 (see FIG. 16).

The target support means 100, shown in a top plan view in FIG. 17, comprises a circular positioning and seating ring 101 from which narrow supporting spokes 102 extend inwardly to hold target substrate 103 on which target 20, defining raster 21, is deposited. It will be appreciated from FIGS. 15-17 that target support means 100 is shaped to have the configuration of a segment of a sphere with radius $R_t$ (essentially equal to $R_{se}$) to provide the required surface configuration for target 20 and the engagement of target positioning and seating ring 101 with spherically configured sealing surface 95 of the cylindrical member. Thus through the use of this spherically configured target support means and the spherically configured surface 95 (or one which conforms to a spherical surface such as shown in FIG. 8) the desired positioning of the entire target surface 20 with respect to mirror 18 is assured. The target support means 100 are preferably formed from stainless steel using wellknown etching techniques.

In order to maintain continuous engagement of target support ring 101 with surface 95, a plurality of spring clips 104 is located around the target support between the internal wall 105 of face plate 98 and ring 101. If target support means 100 is formed of an electrically conducting metal it may serve as an electrical connection between the target and wire 29. Alternatively, as shown in FIGS. 16 and 17, the electrical connection between the target and mirror may be through a thin conductive strip 106 terminating in an enlarged conductive area 107 and wire 29 contacting area 107 in the manner described for the envelope of FIG. 1.

It will be apparent from the above detailed descriptions of the embodiments of the projection television tube envelope which are illustrated as exemplary of the invention, that many combinations of target support means, envelope configurations, sealing techniques and electrical connections within the tube are possible.

Figure 18:
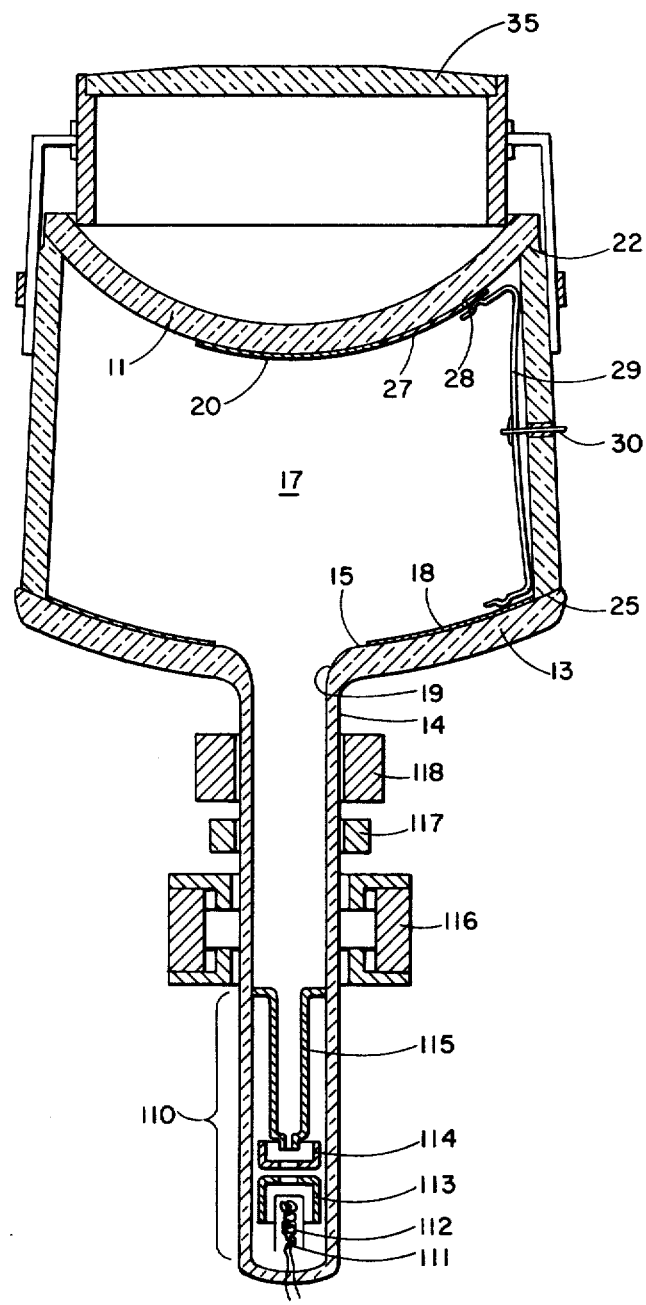
FIG. 18 is a longitudinal cross section of a projection television tube constructed in accordance with this invention and incorporating the tube envelope of FIG. 1.

FIG. 18 is a longitudinal cross section of a projection television tube constructed in accordance with this invention, that is one including the tube envelope of this invention. The tube envelope illustrated in the tube of FIG. 18 is that of FIGS. 1-3. The tube may, however, use any of the envelope embodiments shown or described. In keeping with well-accepted projection television tube design, neck 14 is sealed off to provide fluid-tight evacuated envelope volume 17. An electron gun 110 of well-known design is sealed in neck 14 and is shown to comprise a cathode 111 with associated heater 112, grids 113 and 114 and anode 115 which is electrically connected to annode terminal 30 through the electrical conducting coating 19 which extends down through the internal wall of neck 14 to make contact with annode 115, mirror 18, and wire 29. The projection television tube has a magnetic focusing lens assembly 116, a convergence controlling means 117 and deflection controlling means 118, all of which are standard components.

In the preceding detailed descriptions of the television projection tube envelope and of the tube incorporating the envelope in accordance with this invention, the centers of curvatures of the spheres defining the contours of the mirror, the target surface and the face plate sealing end surface of the cylindrical member have been defined as being essentially coincident. This term as used herein is meant to include any combination of the locii of these centers which satisfies the requirement that the radial distance, $D_c$, from any point on the target surface to the mirror surface is a constant value within a predetermined tolerance range which permits the achievement of the desired optical characteristics and performance of the tube. As will be apparent to those skilled in the art, the real centers of curvatures of the optical elements may be slightly displaced to achieve the optimum optical design which compensates for working at a finite distance.

Thus, for example, in a television projection tube of what might be termed a "standard size" having a radial distance, $D_c$, from target to mirror of about four inches (about 10 cm) the tolerance range for $D_c$ is from about 0.002 to about 0.004 inch (from about 0.050 to about 0.10 mm) greater or less than the predetermined radial distance. This, in turn, means that for such a "standard-size" tube, a slight shifting of the locus of the center of curvature of the sphere corresponding to the target surface either up or down on the tube axis and/or laterally away from the axis which results in a lateral motion of the target support means of no greater than about one-sixteenth of an inch (about 0.06 to about 0.07 inch or about 1.5 to about 1.75 mm) from perfect alignment can be tolerated during assembly and sealing.

Figure 19:
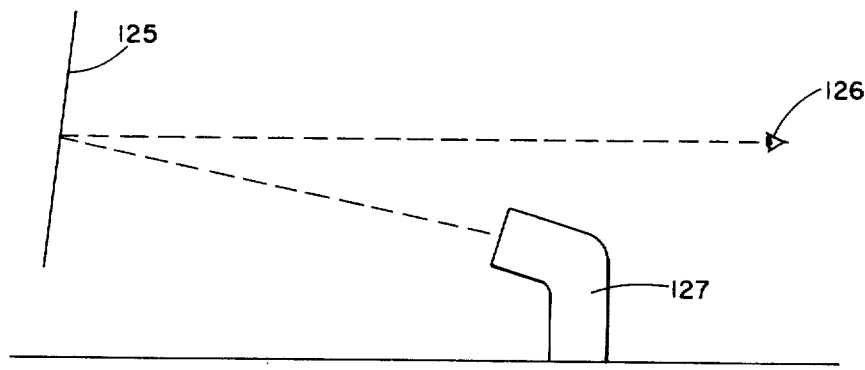
FIG. 19 is a simplified diagram of a projection television system.

In fact, a slight lateral shifting of the locus of the center of curvature defining the target surface configuration from the tube axis is required in a television projection system which uses three separate projection tubes, one each for projecting red, blue and green images. It is not, of course, physically possible to position three tubes to have their axes coincident and the axes cannot be parallel since the images from the three tubes must meet and be precisely superimposed on the screen. Moreover, as will be seen diagrammed in FIG. 19, in order to provide a direct line of sight from the screen 125 to the viewer 126, it is necessary to direct the images from the three tubes housed in projection system 127, at an angle, e.g., from about 5° to 10°. Thus, it is highly desirable if the projection television tube is built to compensate for these factors.

Figure 20:
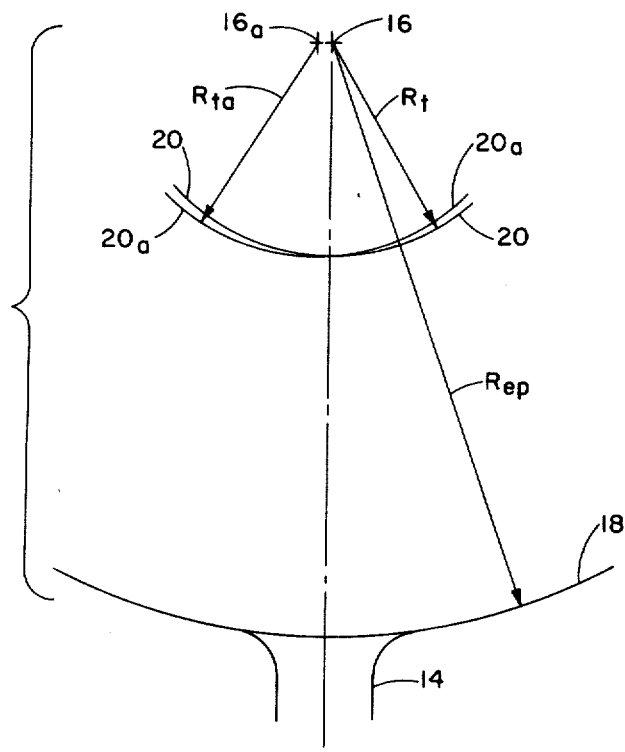
FIG. 20 illustrates diagrammatically the effect of a small lateral shift in the center of the sphere defining the target surface, relative to the mirror surface, to compensate for the optics of a projection television system.

This compensation is readily accomplished in the practice of this invention by a slight lateral shift of the target center of curvature within the limits previously defined. This may be seen in FIG. 20 wherein the magnitude of this lateral shift is exaggerated better to illustrate the effect. It will be seen that when the center 16 of the target surface 20 is shifted to 16a, the target surface 20a also shifts which results in a slight but effective shift of the beam emitted by the tube, thus making it possible to use three projection tubes to precisely superimpose their images on a screen. Generally, such a slight lateral shift of the target center of curvature will range from about 0.005 to about 0.010 inch (from about 0.13 to about 0.25 mm). Such a lateral shift, while accomplishing the desired focusing of the beam, will not violate the prescribed tolerance range for $D_c$. Moreover, any consequent departure, within the established set limits, from the ideal position will not cause any observable degradation within the color television requirements.

The components comprising the envelope, (face plate cylindrical member, end plate and tubulation for the neck) are preferably formed from an electronic glass, the glass in each component having a coefficient of thermal expansion as nearly as possible the same as that of the other components in any one envelope. It is also possible to form the cylindrical member of a ceramic material or metal so long as it also has a coefficient of thermal expansion approximating that of the glass in the other components.

The process of this invention may be illustrated using the formation of the projection television tube of FIG. 18 as an example. The three components of the envelope and a section of tubing to be used as the neck tube are molded and the optical surfaces of the face plate and end plate as well as the sealing surfaces of the cylindrical member are ground and polished to the desired configurations. The optical surfaces of the components are then completed. The target, conductive strip and terminating conductive area are deposited on the internal surface of the face plate. The location of the target within the required area on the face plate surface may be accomplished, for example, by the use of a photosensitive binder in the manner employed in the manufacture of direct-view television tubes. The internal surface of the cylindrical member is coated with an opaque conductive coating, the annode terminal is sealed in the wall and the conductive wire is attached. The mirror is deposited on the end plate surface and the electrically conductive coating is applied to the internal neck joint surface of the face plate and the internal surface of the neck tubulation to a predetermined line. The open neck tubulation is then flame sealed to the end plate. At this point, the required amount of frit is applied to the two sealing ends of the cylindrical member and the face plate and end plate are positioned on the cylindrical member for sealing of the envelope assembly by baking in an oven. This positioning is accomplished by aligning the outer edges of the face plate and cylindrical member and seating the cylindrical member on the end plate to ensure complete continuous contact therewith.

In a typical baking and sealing cycle, 45 minutes are taken to bring the envelope assembly up to the frit activation temperature of about 445° C. This activation temperature level is maintained for about 30 minutes and then about one and one-half hours are used for cooldown. It has been found preferable during the later part of the warmup and early part of the frit activation heating portions of the cycle to raise the temperature of the cylindrical member near the face plate to somewhat above, e.g., about 30° C. above, the temperature of the face plate. This may be done by directing infrared radiation locally on the appropriate area of the cylindrical member surface. This additional localized heating is believed to control the direction of induced strains and thus to form a stronger tube envelope.

In accordance with known practice, the components of the electron gun are then flame sealed into the tube neck, the temperature of the tube is raised to between 350° C. and 400° C., the cathode is electrically activated, and finally the end of the neck is sealed off. Finally, the correcting lens is attached in the manner previously described and the external focusing means affixed to the neck.

It is apparent from the above detailed description of the projection television tube envelope, of the completed tube and of the process for forming the envelope and the tube, that this invention provides a true advancement in the projection television art by providing a relatively simple, inexpensive, optically acceptable television projection tube. This advancement is achieved through the configuration of the components forming the tube envelope and by the use of these envelope components as the sole means to position the target relative to the mirror. Moreover, only one component, the cylindrical member, need be formed with one very accurate dimension.

It will thus be seen that the objects set forth above, among those made apparent from the preceding description, are efficiently attained and, since certain changes may be made in carrying out the above process and in the articles set forth without departing from the scope of the invention, it is intended that all matter contained in the above description or shown in the accompanying drawings shall be interpreted as illustrative and not in a limiting sense.

I claim:

1. An envelope for a projection television tube comprising:

an end plate having an internal reflective surface lying on a spherical surface having a center of curvature located forwardly of the end plate along the projection axis of the tube and an end plate peripheral area including a sealing surface lying on a spherical surface concentric with said reflective surface;

an electron beam target surface spaced forwardly of said end plate and lying on a spherical surface concentric with said reflective surface and located on the same side of said center of curvature as said reflective surface, said target surface intersecting the projection axis of the tube;

a target support having a target support peripheral edge sealing area lying on a spherical surface that is concentric with said target surface, said target support being located between said target surface and said center of curvature, and intersecting the projection axis of the tube, said target support also comprising an imperforate face plate for the envelope;

said target surface being secured to said target support;

a hollow, cylindrical member of predetermined length extending between said end plate peripheral area and said peripheral edge sealing area of said target support, said cylindrical member having an axis of symmetry coextensive with said projection axis, and including opposite sealing end surfaces lying on spherical surfaces concentric with said reflective surface;

said cylindrical member and said target support peripheral edge sealing area being joined along a joint interface surface area lying on a spherical surface that is concentric with said reflective and target surfaces;

said cylindrical member and said end plate sealing surface also being joined along a joint interface surface area lying on a spherical surface that is concentric with said reflective and target surfaces;

said end plate, target support and cylindrical member being respectively bonded together along their mutual joint interface surface areas in sealed relationship.

2. An envelope for a projection television tube in accordance with claim 1, said target support including an internal surface that is spherically curved concentrically about said center of curvature, said target surface comprising a film layer directly secured to the internal surface of said target support.

3. An envelope for a projection television tube according to claim 1, including a target substrate, said target surface being connected to said target support by said target substrate, said target substrate being secured to said target support along a joint interface surface area lying on a spherical surface that is concentric with said reflective and target surfaces, said target substrate including a target receiving area that is concentric with said reflective and target surfaces, said target comprising a film directly secured to said target receiving area.

4. An envelope for a projection television tube in accordance with claim 1, said target support peripheral edge sealing area and said end plate sealing surface comprising continuous surfaces.

5. An envelope for a projection television tube in accordance with claim 1, said target support peripheral edge sealing area comprising a continuous surface, the sealing end surface of said cylindrical member contiguous to said target support peripheral edge sealing area comprising at least a single narrow edge surface.

6. An envelope for a projection television tube in accordance with claim 5, said sealing end surface of said cylindrical member contiguous to said target support peripheral edge sealing area including a pair of narrow edge surfaces with a recessed area between said edge surfaces lying outside the respective spherical surface on which said edge surfaces lie, said area adapted to contain a bonding substance disposed between said cylindrical member and said sealing area of said target support.

7. An envelope for a projection television tube in accordance with claim 1, the sealing end surface of said cylindrical member contiguous to said end plate sealing surface including a recess lying outside said spherical surface on which said sealing end surface lies for containing a bonding substance.

8. An envelope for a projection television tube in accordance with claim 1, the sealing end surface of said cylindrical member contiguous with said end plate sealing area being continuous; said end plate sealing surface further including a recess lying outside said spherical surface on which said sealing surface lies, which recess is arranged to contain a bonding substance.

* * * * *